No. 897,153. PATENTED AUG. 25, 1908.
W. F. RODIES.
SEED PLANTER.
APPLICATION FILED JUNE 11, 1908.
2 SHEETS—SHEET 1.
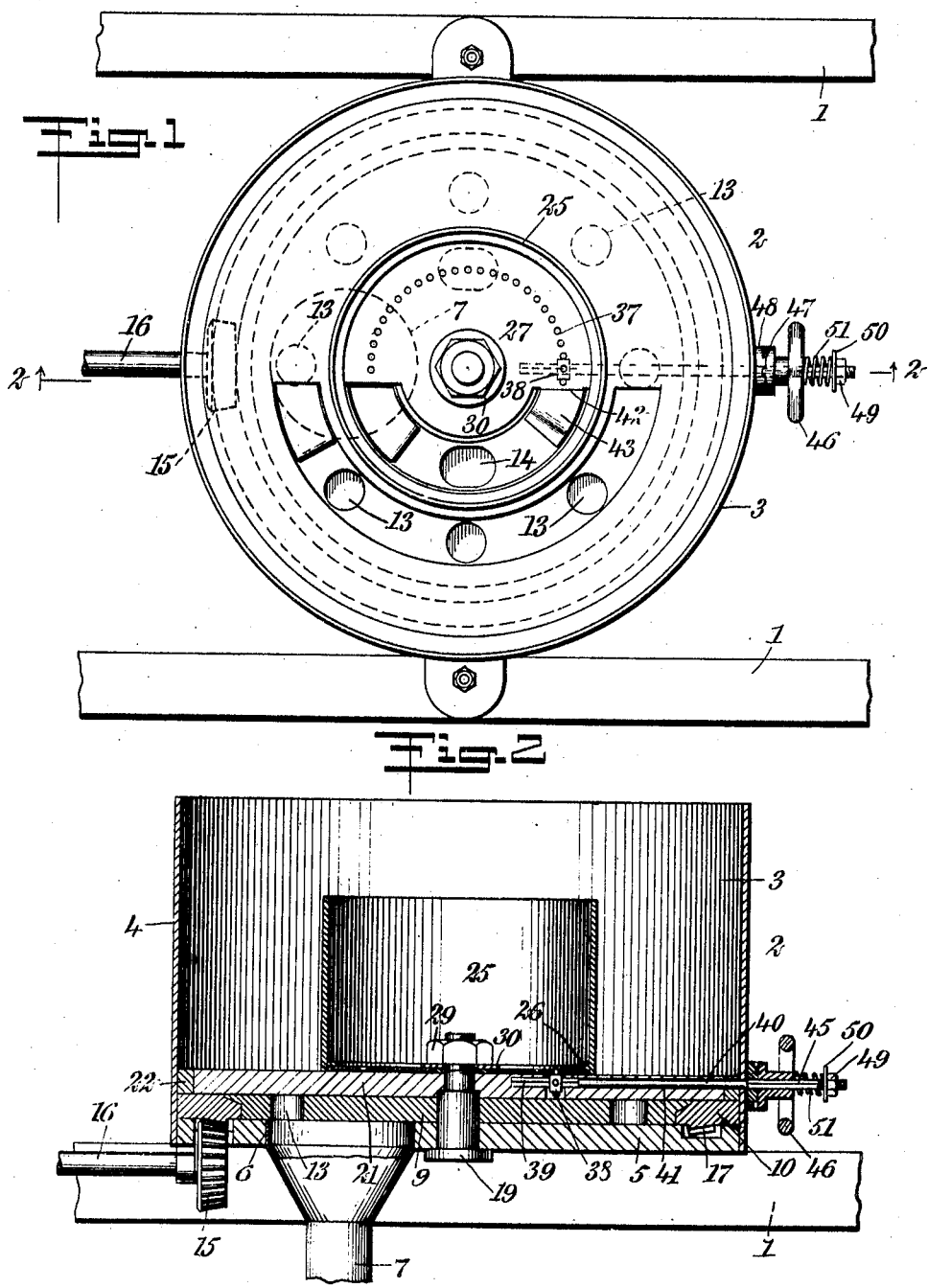
WITNESSES
INVENTOR
William Fred Rodies
BY
ATTORNEYS No. 897,153. PATENTED AUG. 25, 1908.
W. F. RODIES.
SEED PLANTER.
APPLICATION FILED JUNE 11, 1908.
2 SHEETS—SHEET 2.
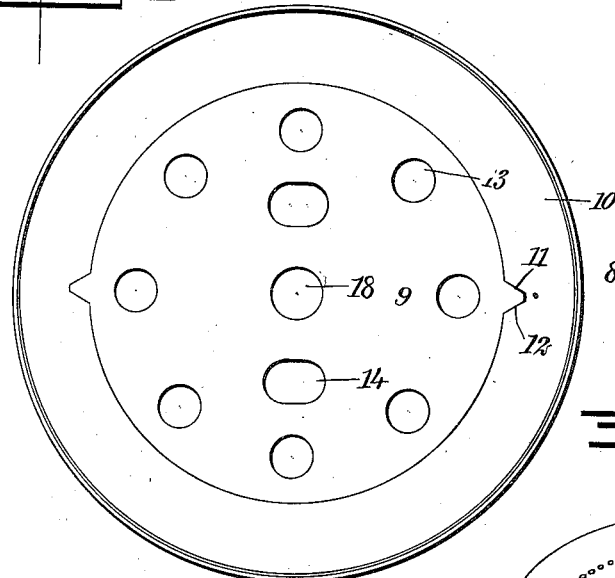
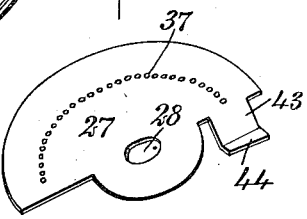
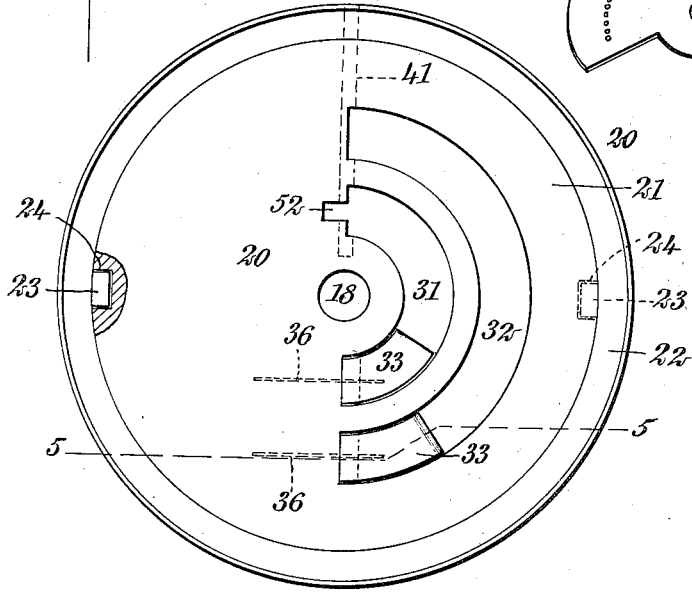
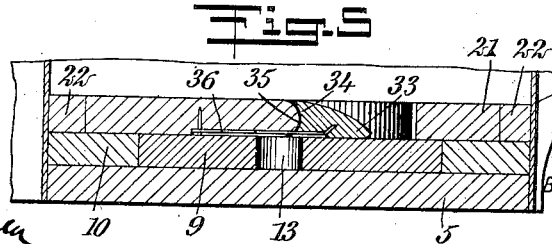
WITNESSES
INVENTOR
William Fred Rodies
BY
ATTORNEYS

UNITED STATES PATENT OFFICE.

WILLIAM FRED RODIES, OF MANCHESTER, IOWA.

SEED-PLANTER.

No. 897,153.

Specification of Letters Patent.

Patented Aug. 25, 1908.

Application filed June 11, 1908. Serial No. 437,854.

*To all whom it may concern:*

Be it known that I, WILLIAM FRED RODIES, a citizen of the United States, and a resident of Manchester, in the county of Delaware and State of Iowa, have invented a new and Improved Seed-Planter, of which the following is a full, clear, and exact description.

This invention relates to seed planters, and the object of the invention is to provide a device of this class which will afford means for sowing or planting different kinds of seeds.

To be more specific, the device is intended to plant corn, and at certain intervals with the corn, pumpkin seeds or seeds of a similar plant.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan showing the device, together with a portion of the frame of the planter to which the device is attached; Fig. 2 is a vertical section through the device taken on the line 2—2 of Fig. 1; Fig. 3 is a plan of the device with the upper part thereof removed so as to show the seed wheel which deposits the seeds by its rotation; Fig. 4 is a view similar to Fig. 3, but showing the cover plate which seats over the wheel and which enables the seeds to be fed to the cover wheel, a part of this view is broken away so as to illustrate more fully the construction; Fig. 5 is a vertical section taken on the line 5—5 of Fig. 4, and further illustrating the construction of the cover plate; and Fig. 6 is a perspective of a seed cut-off for the auxiliary seed box, that is, for the seed box that holds the pumpkin seed.

Referring more particularly to the parts, and especially to Figs. 1 and 2, 1, 1 represent the frame bars of the planting machine which is supposed to be drawn along by horses. These bars are parallel and they support between them the seed hopper 2. This hopper comprises a main seed box 3 which is in the form of an enlarged cylindrical shell 4, having a fixed bottom or bottom plate 5, as shown in Fig. 2. In this bottom plate 5 an opening 6 is provided, at which there is attached to the bottom plate a seed chute or seed-tube 7, which conducts the seed to the ground. Resting on the bottom 5, I provide a seed wheel 8, the construction of which is very clearly shown in Fig. 3. This seed wheel comprises a body or disk 9, and a ring 10. The disk 9 fits neatly in the ring 10 and is provided with spurs 11 which project into recesses 12 in the inner edge of the ring so that when the ring is rotated the disk will also rotate. The upper faces of the disk and ring are flush with each other, as shown. The disk 9 is provided with a plurality of main seed holes 13 which are disposed near the edge of the disk and an equal distance apart. In the illustration I have indicated eight of these openings, but there may be more or less of them, as desired. Diametrically opposite to each other, I provide auxiliary seed holes 14, which are slightly elongated, as shown, and disposed nearer to the center of the wheel. The wheel is adapted to rotate by means of a pinion 15 which is mounted on a shaft 16 driven from the moving part of the vehicle. This pinion meshes with teeth 17 which are formed on the under side of the ring 10. In this way the ring is made to constitute a bevel gear wheel. The seed wheel is provided with a central opening 18 which receives a central pivot pin or post 19 which extends upwardly through the bottom, as shown. Above this seed wheel I provide a cover plate 20 which is clearly illustrated in Fig. 4. This cover plate comprises a circular body 21 about which there is provided a rim 22. The rim is provided at diametrically opposite points with dogs 23 which are received in recesses 24, so that when desired the body of the cover plate may be removed from the rim. The rim is permanently fixed in the main seed box.

Centrally disposed in the main seed box there is mounted an auxiliary seed box 25, having the form of a cylindrical shell, as shown. This shell or seed box, near its lower edge is provided with an inwardly projecting flange 26, and under this flange there is held a cut-off plate 27, which is shown in Fig. 6. This cut-off plate is of substantially semicircular form, and has a central opening 28 which receives the pivot pin or bolt 19. As shown in Fig. 2, the bolt extends up through it and is provided with a nut 29 which is screwed down upon a washer 30. Under the auxiliary seed box, the body of the cover plate 20 is provided with a curved opening or slot 31 which extends through half its circumference, as shown in Fig. 4, and under the main seed box a similar opening or slot 32 is provided. At the ends of these slots, guard toes or cut-offs 33 are provided which are formed with recessed butt ends 34, and these butt ends seat against the rounded or convex edges 35 of the ends of the slot, as shown. The toes taper toward their outer and lower faces, and are held in position by small leaf or wire springs 36. The arrangement is such that the toes project across on the upper face of the seed wheel.

Referring again to Fig. 1, I provide the cut-off plate 27 with a plurality of circumferentially disposed openings or pin holes 37, and these pin holes are adapted to be engaged by the teeth of a small spur wheel 38 which is mounted on a square neck 39 formed upon a stem 40. This stem is rotatably mounted in a bore 41 which extends radially inward in the cover plate 20, passing through the rim and through the body, as shown. As shown in Fig. 1, the cut-off plate 27 has a substantially radially disposed edge 42 and from this edge an integral tongue 43 extends downwardly. The lower end of this tongue is bent so as to form a shoe or cut-off 44 which rests upon the upper side of the seed wheel at this point. The width of the tongue 43 is substantially the same as the width of the slot 31 into which the tongue projects. The stem 40 projects from the side of the seed box, as shown in Figs. 1 and 2, and at this point is formed with a square neck 45, upon which there is slidably mounted a wheel 46. This wheel is formed with a hub, the inner portion whereof is formed into a clutch 47, and this clutch is formed with teeth which fit in notches in a correspondingly formed clutch 48, the said clutch being rigidly attached to the side of the main seed box, as indicated. It should be understood that the opening in the wheel 46 through which the neck 45 passes, is square like the shaft, and fits closely thereto, so that if the wheel were rotated, the stem 40 would rotate. The outer end of the stem 40 is threaded, as indicated, so as to receive a nut 49 and a washer 50. The stem projects well beyond the wheel, and between the washer 50 and the outer side of the wheel, a coil spring 51 is provided. This spring tends to hold the wheel against the clutch seat 48 so as to lock the wheel against rotation, and this of course also locks the stem 40 against rotation. The normal position of the cut-off plate is shown in Fig. 1. When in this position the slot 31 is exposed to the interior of the auxiliary seed box.

The mode of operation of the device will now be described. As the seed wheel rotates, the openings 14 pass under the slot 31 and in so passing, they become filled with seed. After one of these openings passes under the toe 33 it passes over the seed tube or chute 7, and the seed drops out of the opening and falls to the ground. The main seed openings 13 in a similar manner are passing under the slot 32 and are becoming filled with seeds which also fall into the chute 7 and pass to the ground. In this way at every fourth hill of corn in which seed is deposited, the seeds, such as pumpkin, which are within the auxiliary seed box, will be deposited simultaneously with the corn. If it is desired at any time to discontinue the depositing of the pumpkin seeds, the wheel 46 is pulled outwardly so as to disengage its hub 47, and it will then be rotated in a left-hand direction. This will operate to rotate the cut-off plate 27 in a left-hand direction, and will advance the tongue 43 in the slot 31, until its shoe 44 engages under the edge of the toe 33; when in this position the slot 31 will be closed and no more seed will be fed to the openings 14 as the wheel rotates. In order to provide space for the spur wheel 38, the body 21 of the cover plate is provided with a notch or recess 52, as indicated in Fig. 4. On account of the manner of mounting the body 21 of the cover plate in position, it will be evident that this body may be removed without removing the rim 22. It will of course be necessary to withdraw the stem 40 before removing the cover plate body. In like manner it will be evident that the center or disk 9 of the seed wheel may be removed and seed wheels of different kinds may be used, having different openings and differently arranged if desired.

It will be apparent that if the tongue 43 were omitted, the cut-off plate 27 could still be used to cut off the flow of seed from the auxiliary seed box, but the advantage in providing the tongue is that the tongue extends under the toe 33 and prevents the seed from jamming on the upper side of the toe, as it would otherwise do; if the seed should jam as suggested it would wedge the toe down upon the wheel and tend to prevent the rotation of the wheel.

Having thus described my invention, I claim as new and desire to secure by Letters Patent,—

1. A seed planter, in combination, a main seed box, an auxiliary seed box disposed centrally therein, a seed wheel having a set of openings taking seed from said main seed box and a second set of openings taking seed from said auxiliary seed box, a cover plate over said seed wheel a rotatable cut-off plate in said auxiliary seed box and adapted to cut-off the flow of seed therefrom, a stem extending inwardly on the outer side of said main seed box, means carried thereby for rotating said cut-off plate, a wheel mounted on said stem for rotating the same, and means for locking the said stem against rotation.

2. In a seed planter, in combination, a main seed box, an auxiliary seed box centrally mounted therein, a seed wheel having a set of openings feeding seed from said main seed box, and having a second set of openings feeding seed from said auxiliary seed box, a cover plate over said seed wheel a cut-off plate in said auxiliary seed box, a stem having a pin wheel adapted to rotate said cut-off plate, said stem projecting from the side wall of said main seed box, a wheel mounted on the projecting portion of said stem and adapted to rotate said stem, said wheel having a hub constituting a clutch member, a clutch seat for said clutch member adapted to lock said wheel against rotation, and a spring about said stem normally holding said wheel against said clutch seat.

3. In a seed planter, in combination, a main seed box, an auxiliary seed box disposed centrally therein, a seed wheel having openings adapted to feed seed from said boxes, a cover plate over said seed wheel a cut-off plate in said auxiliary seed box adapted to cut-off the flow of seed therefrom when rotated, a stem extending outwardly through the side wall of said main seed box, means for rotating said cut-off plate by said stem, a wheel mounted on said stem and adapted to rotate the same, means for locking said wheel against rotation, and a spring around said stem tending to hold said wheel in its locked position.

4. In a seed planter, in combination, a seed box having a cover plate at the bottom thereof with a slot therein, a rotatable seed wheel having openings extending under said slot to feed seed from said seed box, a cover plate over said seed wheel a toe mounted in said slot, a cut-off plate rotatably mounted over said seed plate and having a tongue projecting down into said slot, said tongue being adapted to engage said toe when said cut-off plate is rotated, and means for rotating said cut-off plate.

5. In a seed planter, in combination, a main seed box, an auxiliary seed box mounted centrally therein, a cover plate having a circumferential slot therein disposed at the bottom of said main seed box, said cover plate having a second circumferentially disposed slot in the bottom of said auxiliary seed box, a seed wheel having a set of openings coöperating with said first slot to feed seed from said main seed box, and having a second set of openings extending under said second slot for feeding seed from said auxiliary seed box, a toe resiliently mounted in said second slot, a cut-off plate rotatably mounted in said auxiliary seed box and having a projecting tongue extending into the slot of said auxiliary seed box, and means for rotating said cut-off plate to engage said tongue with said toe.

In testimony whereof I have signed my name to this specification in the presence of two subscribing witnesses.

WILLIAM FRED RODIES.

Witnesses:
   WILLIAM W. MATTHEWS,
   A. I. BRUCE.